United States Patent
Zhou et al.

(10) Patent No.: US 8,665,564 B2
(45) Date of Patent: Mar. 4, 2014

(54) SUSPENSION WITH FURCATED WRITE WIRE, HEAD GIMBAL ASSEMBLY AND DISK DRIVE UNIT WITH THE SAME

(75) Inventors: Haiming Zhou, Hong Kong (CN); Xianwen Feng, DongGuan (CN); Tamotsu Tani, Hong Kong (CN); Fuquan Pang, DongGuan (CN); Jinbo Qiu, Dong Guan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 103 days.

(21) Appl. No.: 12/801,578

(22) Filed: Jun. 15, 2010

(65) Prior Publication Data

US 2011/0228426 A1   Sep. 22, 2011

(30) Foreign Application Priority Data

Mar. 19, 2010 (CN) .......................... 2010 1 0135798

(51) Int. Cl.
*G11B 21/16* (2006.01)
*G11B 5/48* (2006.01)

(52) U.S. Cl.
USPC ...................................... 360/245.9

(58) Field of Classification Search
USPC ............. 360/245.8, 245.9, 246, 264.2, 266.3
See application file for complete search history.

(56) References Cited

U.S. PATENT DOCUMENTS

| | | | | |
|---|---|---|---|---|
| 5,812,344 A | * | 9/1998 | Balakrishnan | 360/245.9 |
| 6,038,102 A | * | 3/2000 | Balakrishnan et al. | 360/264.2 |
| 6,163,443 A | * | 12/2000 | Hatagami et al. | 360/245.9 |
| 6,631,052 B1 | * | 10/2003 | Girard et al. | 360/245.8 |
| 2004/0252413 A1 | * | 12/2004 | Nishiyama | 360/245.9 |
| 2010/0007993 A1 | * | 1/2010 | Contreras et al. | 360/245.8 |
| 2011/0141626 A1 | * | 6/2011 | Contreras et al. | 360/245.8 |
| 2011/0149441 A1 | * | 6/2011 | Alex et al. | 360/245.8 |

* cited by examiner

Primary Examiner — Craig A. Renner
(74) Attorney, Agent, or Firm — Nixon & Vanderhye P.C.

(57) ABSTRACT

A suspension comprises a flexure and a plurality of electrical traces. The flexure has a leading portion and a tailing portion, and has a laminated structure comprising a substrate layer, a dielectric layer, and a grounding layer sandwiched therebetween. The electrical traces comprise at least one pair of write traces, each write trace has a bonding pad positioned on the leading portion, a terminal pad positioned on the tailing portion, and a write wire connecting the bonding pad and the terminal pad, the write wire has at least one portion being furcated into at least two sub wires. The present invention can lower the impedance and decrease the signal transmission loss, and widen the frequency bandwidth simultaneously. The invention also discloses a HGA and a disk drive unit.

17 Claims, 13 Drawing Sheets

US 8,665,564 B2

SUSPENSION WITH FURCATED WRITE WIRE, HEAD GIMBAL ASSEMBLY AND DISK DRIVE UNIT WITH THE SAME

This application claims priority to Chinese Application No. 201010135798.2 filed Mar. 19, 2010, the entire contents of which is hereby incorporated by reference in this application.

FIELD OF THE INVENTION

The present invention relates to information recording disk drive devices and, more particularly, to a suspension, head gimbal assembly (HGA) and disk drive unit with the same.

BACKGROUND OF THE INVENTION

Hard disk drives are common information storage devices. FIG. 1a provides an illustration of a typical disk drive unit 100 essentially consisting of a series of rotatable disks 101 mounted on a spindle motor 102, and a Head Stack Assembly (HSA) 130 which is rotatable about an actuator arm axis 105 for accessing data tracks on disks during seeking. The HSA 130 includes at least one drive arm 104 and HGA 150. Typically, a spindling voice-coil motor (VCM) is provided for controlling the motion of the drive arm 104.

Referring to FIG. 1b, the HGA 150 includes a slider 103 having a reading/writing transducer (not shown) imbedded therein, a suspension 190 to load or suspend the slider 103 thereon. When the disk drive is on, a spindle motor 102 will rotate the disk 101 at a high speed, and the slider 103 will fly above the disk 101 due to the air pressure drawn by the rotated disk 101. The slider 103 moves across the surface of the disk 101 in the radius direction under the control of the VCM. With a different track, the slider 103 can read data from or write data to the disk 101.

FIG. 1c shows a conventional suspension, the suspension 190 includes a load beam 106, a base plate 108, a hinge 107 and a flexure 105, all of which are assembled together.

The load beam 106 is connected to the base plate 108 by the hinge 107. A locating hole 112 is formed on the load beam 106 for aligning the load beam 106 with the flexure 105. And the load beam 106 is welded with the flexure for increasing the strength of the entire structure.

The base plate 108 is used to enhance structure stiffness of the whole HGA 150. A mounting hole 113 is formed on one end of the base plate 108 for mounting the whole HGA 150 to the motor arm 104 (referring to FIG. 1a). Another hole 110 is formed on the other end of the base plate 108, which is aligned with a hole 110' formed on the hinge 107 and a hole 110" formed on the flexure 105. The hinge 107 has a mounting hole 113' formed on its one end corresponding to the mounting hole 113 of the base plate 108, and the hinge 107 is partially mounted to the base plate 108 with the mounting holes 113', 113 aligned with each other. The hinge 107 and the base plate 108 may be mounted together by laser welding at pinpoints 109 distributed on the hinge 107. Two hinge steps 115 are integrally formed at two sides of the hinge 107 at one end adjacent the mounting hole 113' for connecting with the flexure 105.

The flexure 105 runs from the hinge 107 to the load beam 106. The flexure 105 has a proximal end 119 adjacent the hinge 107 and a distal end 118 adjacent the load beam 106. A locating hole 112' is formed on the distal end 118 of the flexure 105 and aligned with the locating hole 112 of the load beam 106, thus obtaining a high assembly precision. A suspension tongue 116 is provided at the distal end of the flexure 105 to carry the slider 103 thereon.

As illustrated in FIG. 1d, the flexure 105 has a leading portion 121 adjacent the suspension tongue 116, and a tailing portion 122 opposite to the leading portion 121. A plurality of electrical traces 120 is formed on the flexure 105 along length direction thereof. More specifically, the electrical traces 120 begin with the leading portion 121 and terminate at the tailing portion 122. The suspension tongue 116 has a plurality of bonding pads 117 formed thereon for coupling the slider 103. One end of the electrical traces 120 connects to the bonding pads 117, and the other end thereof is electrically connected to a preamplifier (not shown). Generally, the electrical traces 120 extending from the bonding pads 117 includes three pairs which respectively are a couple of read traces 123, write traces 124 and heat traces 125 as shown in FIG. 1e. All of traces will be jointed to several terminal pads 126 at the tailing portion 122.

FIG. 1f shows a cross-section view of the detailed structure of the flexure 105 taken along the line A-A shown in FIG. 1d. The flexure 105 has a laminate structure 130 including a resilient stainless steel layer 131, a grounding layer 132 formed thereon, a polyimide layer 133 formed on the grounding layer 132. As known that, the grounding layer 132 functions as grounding the read and write traces 123, 124 while the current signal transmitted through the suspension 190. Therefore, the grounding layer 132 can widen the frequency bandwidth to satisfy the requirement commonly. However, the impedance must be low on the write traces 124 side so as to minimize the signal transmission loss. By such a design mentioned above, although the grounding layer 132 also can reduce the impedance to a degree, the effect is very small and couldn't satisfy the actual demand. A large signal transmission loss still happens during transmission, which will influence the writing performance of the slider.

Thus, there is a need for an improved suspension, HGA and disk drive unit that do not suffer from the above-mentioned drawbacks.

SUMMARY OF THE INVENTION

One aspect of the present invention is to provide a suspension having writing wires each at least including one portion being furcated into at least two sub wires, so as to lower the impedance and decrease the signal transmission loss, and widen the frequency bandwidth simultaneously.

Another aspect of the present invention is to provide a HGA having writing wires each at least including one portion being furcated into at least two sub wires formed on the suspension thereof, so as to lower the impedance and decrease the signal transmission loss, and widen the frequency bandwidth simultaneously.

Yet another aspect of the present invention is to provide a disk drive unit having write wires each at least including one portion being furcated into at least two sub wires formed on the suspension thereof, so as to lower the impedance and decrease the signal transmission loss, and widen the frequency bandwidth simultaneously.

To achieve above objectives, a suspension for a HGA comprises a flexure and a plurality of electrical traces. The flexure has a leading portion and a tailing portion opposite to the leading portion, and the flexure has a laminated structure comprising a substrate layer, a dielectric layer, and a grounding layer sandwiched therebetween. The electrical traces are formed on the dielectric layer and extending from the leading portion to the tailing portion. The electrical traces comprise at least one pair of write traces, each write trace has a bonding pad positioned on the leading portion, a terminal pad positioned on the tailing portion, and a write wire connecting the bonding pad and the terminal pad, the write wire has at least one portion being furcated into at least two sub wires.

As an embodiment of the present invention, the width of each sub wire is in the range of 10 μm to 180 μm.

Preferably, the spacing between the sub wires is in the range of 10 μm to 20 μm.

As another embodiment of the present invention, the grounding layer is made of high conductivity material.

Preferably, the high conductivity material is copper.

Preferably, the thickness of the grounding layer is in the range of 1 μm to 5 μm.

Preferably, the substrate layer is made of stainless steel.

Preferably, the flexure further comprises a cover layer formed on the electrical traces.

A HGA comprises a slider and a suspension for supporting the slider. The suspension comprises a flexure and a plurality of electrical traces. The flexure has a leading portion and a tailing portion opposite to the leading portion, and the flexure has a laminated structure comprising a substrate layer, a dielectric layer, and a grounding layer sandwiched therebetween. The electrical traces are formed on the dielectric layer and extending from the leading portion to the tailing portion. The electrical traces comprise at least one pair of write traces, each write trace has a bonding pad positioned on the leading portion, a terminal pad positioned on the tailing portion, and a write wire connecting the bonding pad and the terminal pad, the write wire has at least one portion being furcated into at least two sub wires.

As an embodiment of the present invention, the width of each sub wire is in the range of 10 μm to 180 μm.

Preferably, the spacing between the sub wires is in the range of 10 μm to 20 μm.

As another embodiment of the present invention, the grounding layer is made of high conductivity material.

Preferably, the high conductivity material is copper.

Preferably, the thickness of the grounding layer is in the range of 1 μm to 5 μm.

Preferably, the substrate layer is made of stainless steel.

Preferably, the flexure further comprises a cover layer formed on the electrical traces.

A disk drive unit comprises a HGA including a slider and a suspension that supports the slider, a drive arm connected to the HGA, a series of disks and a spindle motor operable to spin the disks. The suspension comprises a flexure and a plurality of electrical traces. The flexure has a leading portion and a tailing portion opposite to the leading portion, and the flexure has a laminated structure comprising a substrate layer, a dielectric layer, and a grounding layer sandwiched therebetween. The electrical traces are formed on the dielectric layer and extending from the leading portion to the tailing portion. The electrical traces comprise at least one pair of write traces, each write trace has a bonding pad positioned on the leading portion, a terminal pad positioned on the tailing portion, and a write wire connecting the bonding pad and the terminal pad, the write wire has at least one portion being furcated into at least two sub wires.

Compared with the prior art, since the write wire of the present invention has at least one portion being furcated into at least two sub wires, thus the impedance is decreased and the signal transmission loss is decreased in turn, which is beneficial to the performance of the writing operation. On the other hand, due to the grounding layer is configured, thus a sufficient wide frequency bandwidth can be obtained and maintained. Therefore, in the present invention, it can achieve not only a low impedance to decrease the signal transmission loss, but also a wide frequency bandwidth to improve the writing performance.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1A:
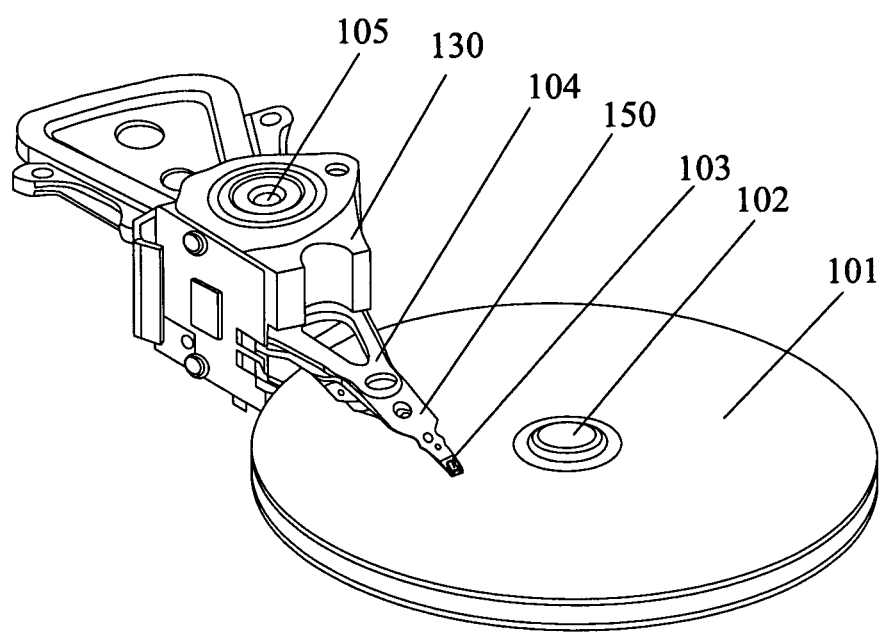
FIG. 1a is a perspective view of a conventional disk drive unit.
Figure 1B:
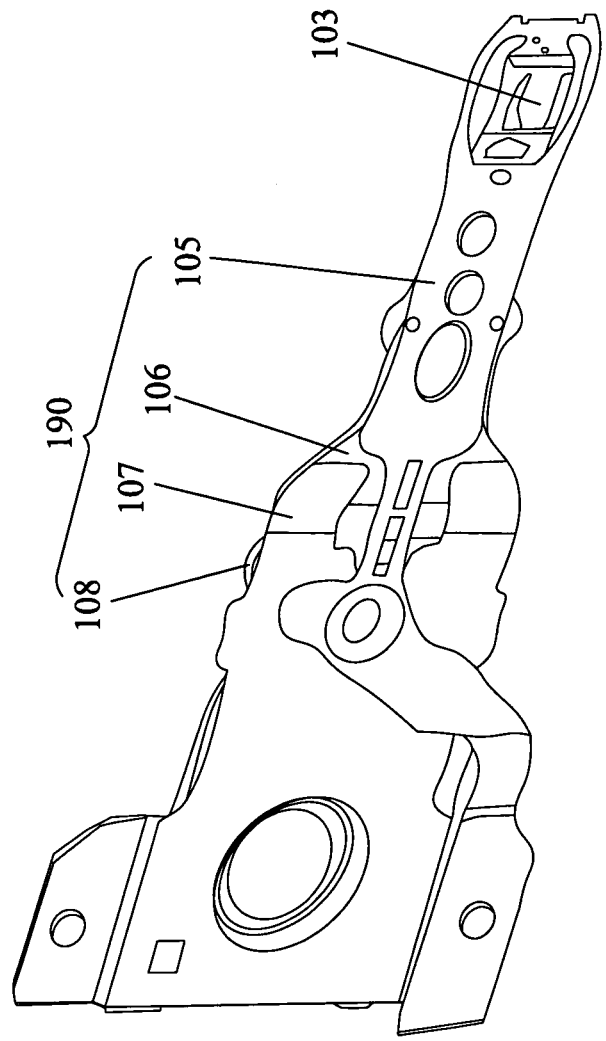
FIG. 1b is a perspective view of a conventional HGA.
Figure 1C:
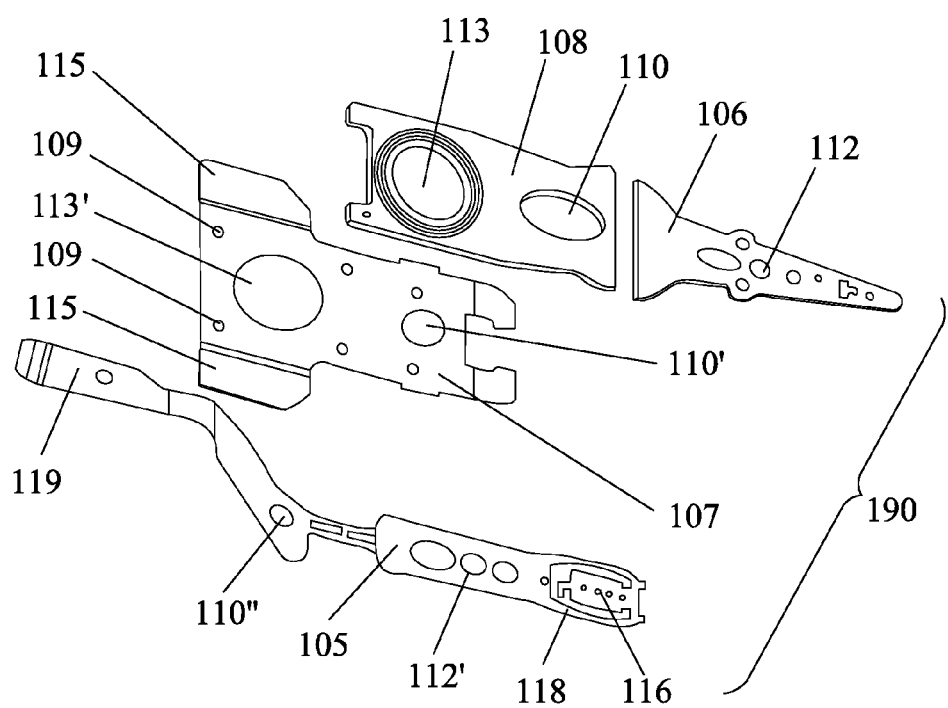
FIG. 1c is an exploded perspective view of the HGA shown in FIG. 1b.
Figure 1D:
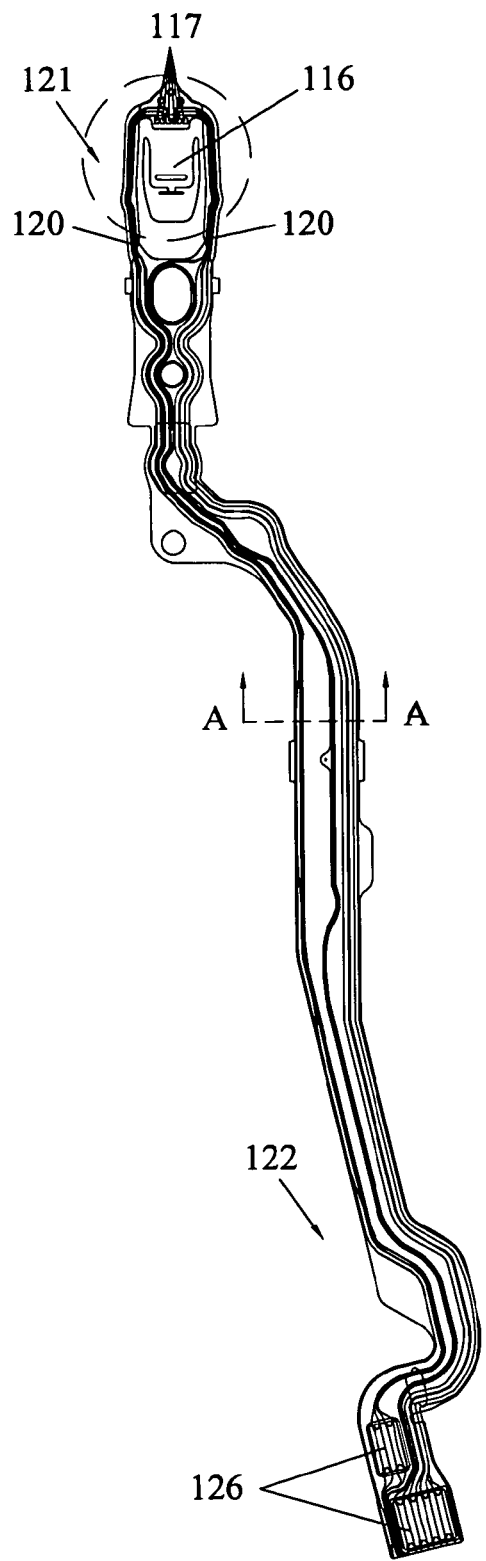
FIG. 1d is a top plan view of a flexure of the suspension shown in FIG. 1c.
Figure 1E:
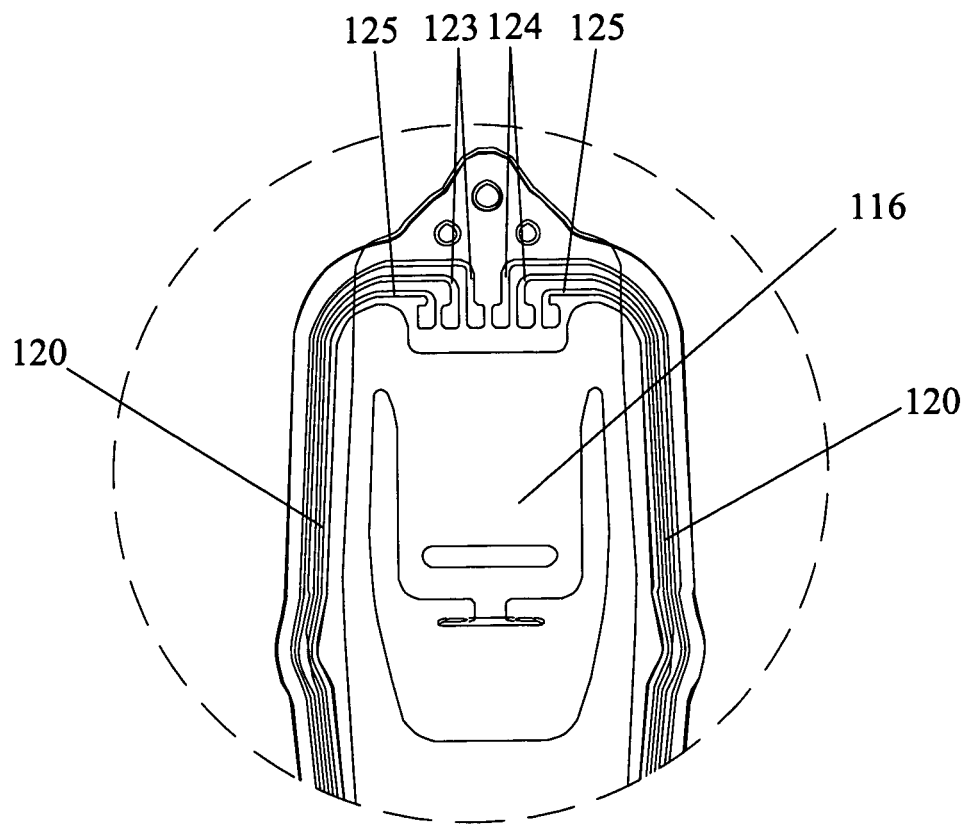
FIG. 1e is a enlarged view of the leading portion of the flexure illustrated by the broken line shown in FIG. 1d.
Figure 1F:
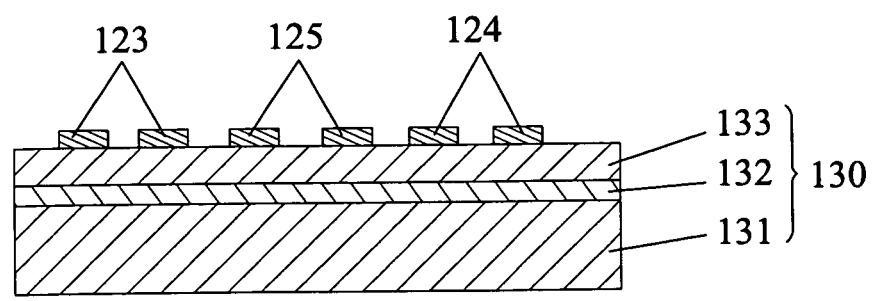
FIG. 1f is a cross-section view of the detailed structure of the flexure taken along the line A-A shown in FIG. 1d.

Various preferred embodiments of the invention will now be described with reference to the figures, wherein like reference numerals designate similar parts throughout the various views. As indicated above, the invention is directed to a suspension for a HGA of a disk drive unit, which includes write wires each having at least one portion being furcated into at least two sub wires to lower the impedance and decrease the signal transmission loss, and widen the frequency bandwidth simultaneously.

Figure 2:
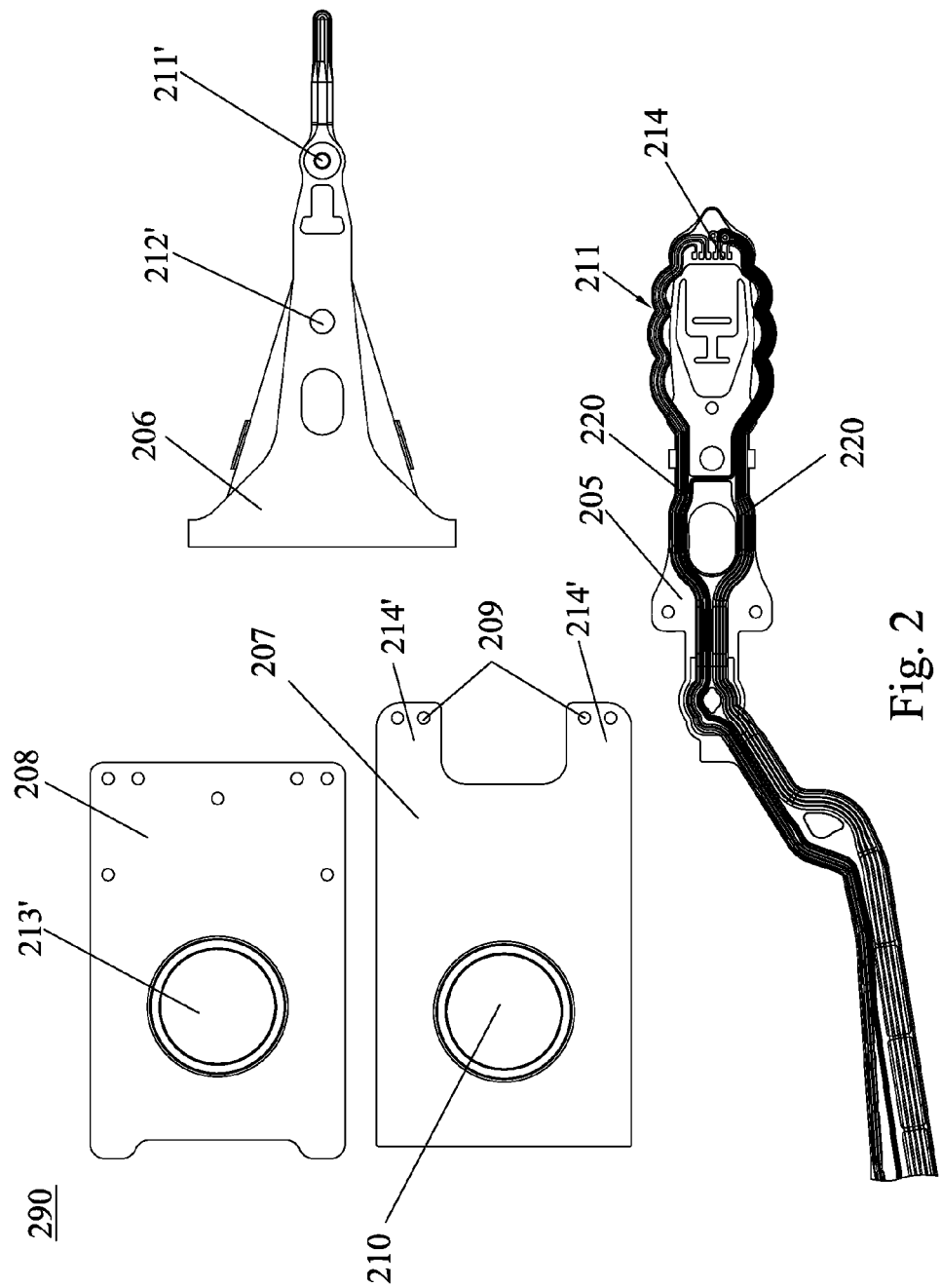
FIG. 2 is an exploded perspective view of a suspension according to an embodiment of the present invention.

FIG. 2 shows an embodiment of a suspension of the present invention. As illustrated in FIG. 2, a suspension 290 including a load beam 206, a base plate 208, a hinge 207 and a flexure 205, all of which are assembled with each other.

Referring to FIG. 2, the load beam 206 is used to transfer load forces to the flexure 205 and a slider mounted on the flexure 205. Any suitable rigid material such as stainless steel may be used to form the load beam 206 such that the load beam 206 has sufficient stiffness to transfer the load forces to the flexure 205. The load beam 206 is connected to the base plate 208 by the hinge 207. A locating hole 212' is formed on the load beam 206 for aligning itself with the flexure 205. A dimple 211' is formed on the load beam 206 to support the flexure 205 at a position corresponding to a center of the slider. By this engagement of the dimple 211' with the flexure 205, the load forces can be transferred to the slider uniformly.

The base plate 208 is used to enhance structure stiffness of the whole suspension 290 and may be made of rigid material such as stainless steel. A mounting hole 213' is formed on one end of the base plate 208 for mounting the whole suspension 290 to a motor arm of a disk drive unit.

The hinge 207 has a mounting hole 210 formed on its one end corresponding to the mounting hole 213' of the base plate 208, and the hinge 207 is partially mounted to the base plate 208 with the mounting holes 210, 213' aligned with each other. The hinge 207 and the base plate 208 may be mounted together by laser welding at a plurality of pinpoints 209 distributed on the hinge 207. Two hinge struts 214' are extended from the two sides of the hinge 207 to partially mount the hinge 207 to the load beam 206.

Figure 3:
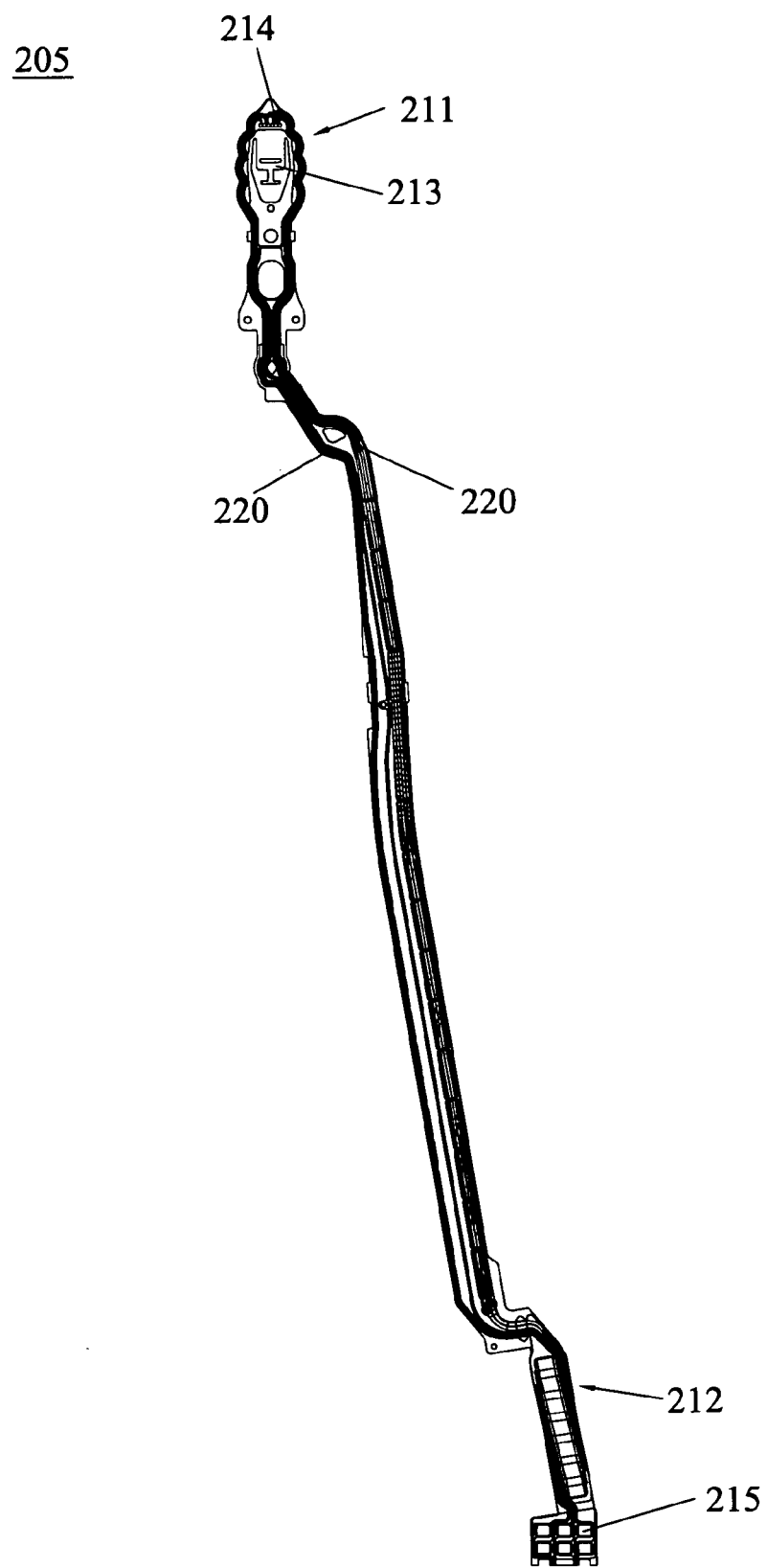
FIG. 3 is an top plan view of a flexure of the suspension shown in FIG. 2.

As shown in FIGS. 2-3, the flexure 205 runs from the hinge 207 to the load beam 206. The flexure 205 has a leading portion 211 and a tailing portion 212 opposite to the leading portion 211. A suspension tongue 213 is provided at the leading portion 211 of the flexure 205 to support a slider 203 (referring to FIG. 8) thereon. A plurality of electrical traces 220 is formed on the flexure 205 along length direction thereof. More specifically, the electrical traces 220 extend from the leading portion 211 to the tailing portion 212. More concretely, the electrical traces 220 have several pads (not indicated) positioned at the leading portion 211 of the flexure 205, so as to couple the slider 203 at the suspension tongue 213. Similarly, the electrical traces 220 also have several pads (not indicated) positioned at the tailing portion 212 of the flexure 205, so as to connect with a flexure printed cable (not shown).

Figure 4:
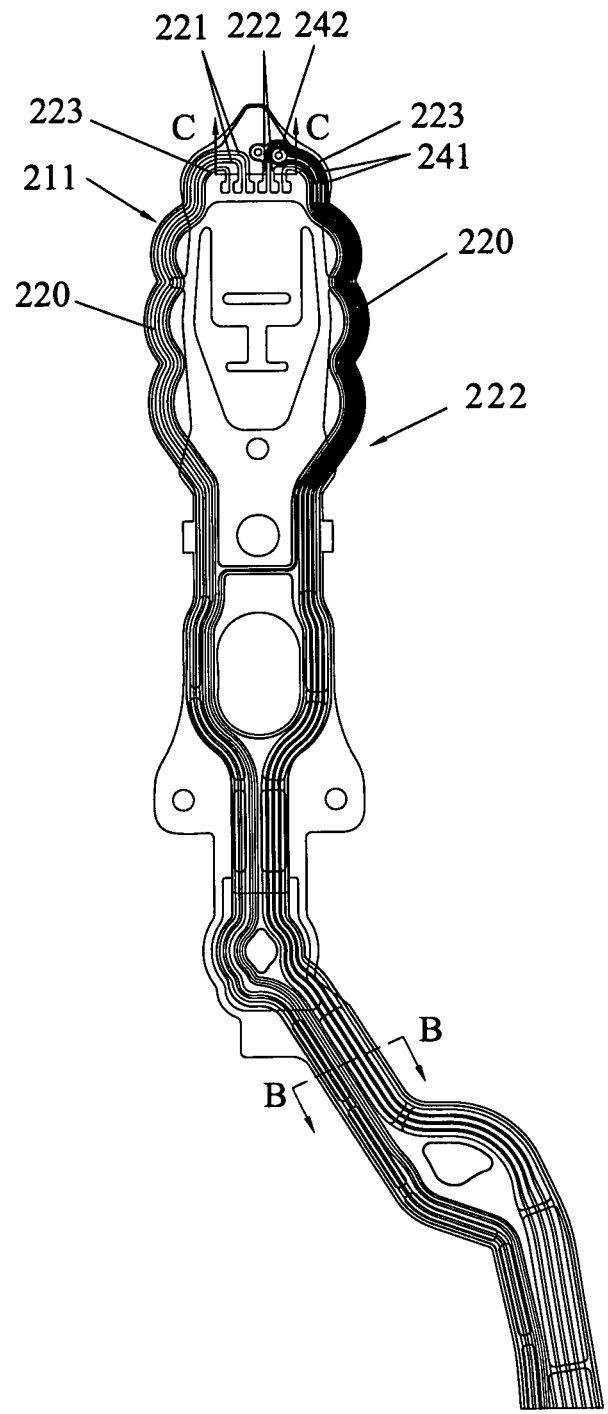
FIG. 4 is a detailed structure view of a leading portion of the flexure shown in FIG. 3.

FIG. 4 shows a detailed structure view of the leading portion 211 of the flexure 205. The electrical traces 220 respectively include a pair of read traces 221, write traces 222 and heat traces 223. Combining with FIG. 5, each of write traces 222 includes a bonding pad 214 positioned on the leading portion 211, a terminal pad 215 positioned on the tailing portion 212, and a write wire connecting the bonding pad 214 and the terminal pad 215. Concretely, the write wire has at least one portion being furcated into at least two sub wires 241. The detailed description follows.

Figure 6A:
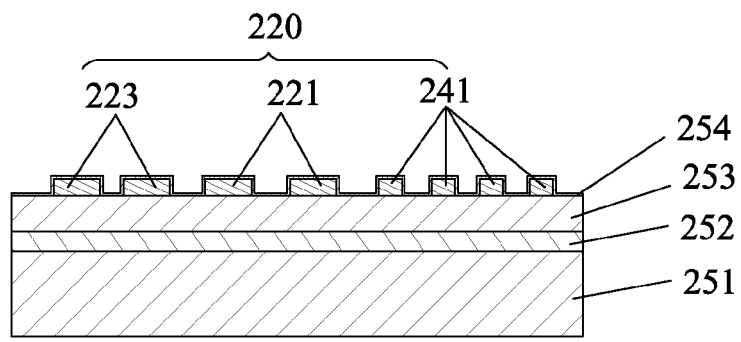
FIG. 6a is a cross-section view of the electrical traces taken along the line B-B of the FIG. 4 according to an embodiment of the present invention.
Figure 6B:
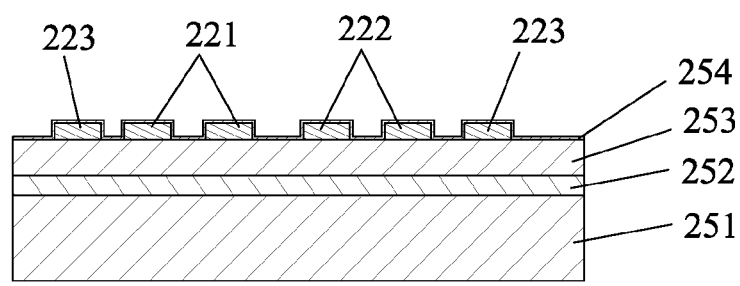
FIG. 6b is a cross-section view of the electrical traces taken along the line C-C of the FIG. 4.

In this embodiment, as illustrated in FIGS. 6a-6b, each write wire is furcated into two sub wires 241 extended from the leading portion 211 to the tailing portion 212. And a forked portion 242 and a confluent portion 243 are formed on each end of the sub wire 241 respectively. Specifically, the forked portion 242 serves as dividing the write wire into two sections to form the two sub wires 241, and the confluent portion 243 is used for joining the two sub wires 241 to a single write wire. As the method of dividing or the joining the write wire is the conventional technical means, thus its detailed description is omitted here.

FIG. 6a shows a cross-section view of the electrical traces 220 taken along the line B-B of the FIG. 4 according to an embodiment of the present invention, which illustrates the detailed structure of the flexure 205. As shown, the flexure 205 has a laminate structure that includes a substrate layer 251 that is made of a low conductivity thin plate. The low conductivity thin plate is, for example, a resilient thin stainless steel (SST) plate. On the substrate 251, a dielectric layer 253 is formed. A grounding layer 252 is formed between the substrate layer 251 and the dielectric layer 253. On the dielectric layer 253, the electrical traces 220 are formed. More specifically, the electrical traces 220 respectively are a pair of read traces 221, two pairs of sub wires 241 and a pair of heat traces 223. Preferably, a cover layer 254 is formed and covered the surfaces of the traces 221, 241, 223 to protect them from external force and the like. It should be noticed that, the grounding layer 252 can be configured to cover the substrate layer 251 entirely, or namely cover the substrate 251 on the side of the write trace 222, as shown in FIG. 6d.

Figure 7A:
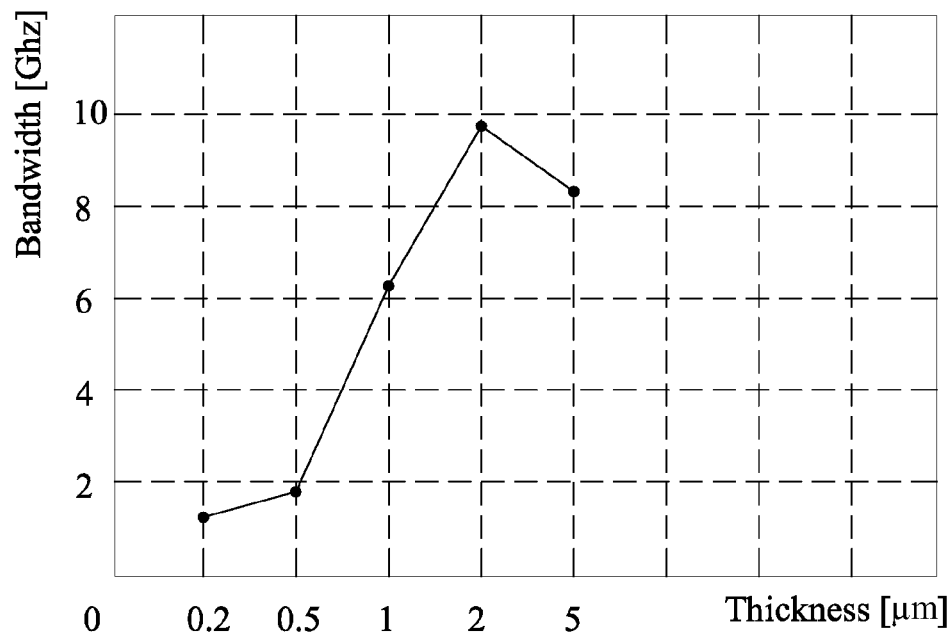
FIG. 7a is a graph showing the relationship between the thickness of the copper thin plate and the frequency bandwidth.
Figure 7B:
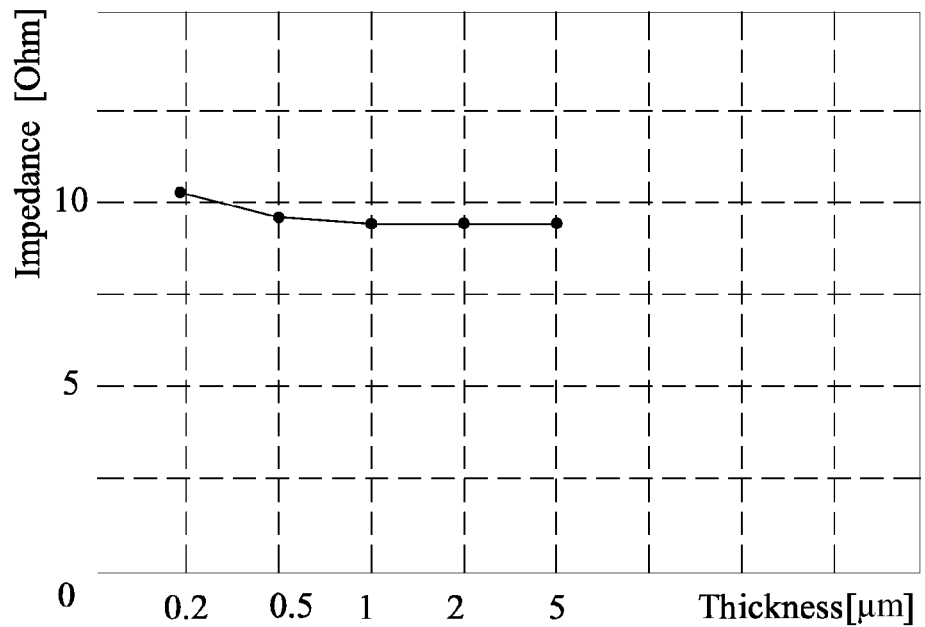
FIG. 7b is a graph showing the relationship between the thickness of the copper thin plate and the impedance under a specific width of the write wire.

Specifically, in the present invention, the dielectric layer 253 is made of flexible dielectric resin such as polyimide and has a thickness of about 5 μm to 20 μm. The grounding layer 252 is made of high conductivity material, whose conductivity is much higher than that of the SST. For example, the grounding layer 252 can apply copper thin plate. It should be noticed that, the copper thin plate is mainly aiming at improving the frequency bandwidth. Preferably, the thickness of the copper thin plate in the range of 1 μm to 5 μm, to obtain a wider frequency bandwidth. The effect of such a design will be presented in FIG. 7a, which shows the relationship between the thickness of the copper thin plate and the frequency bandwidth. On the contrary, the thickness of the copper thin plate does not affect the impedance performance significantly, as shown in FIG. 7b. The curve is rather flat and even, the impedance hardly has any change.

Figure 5:
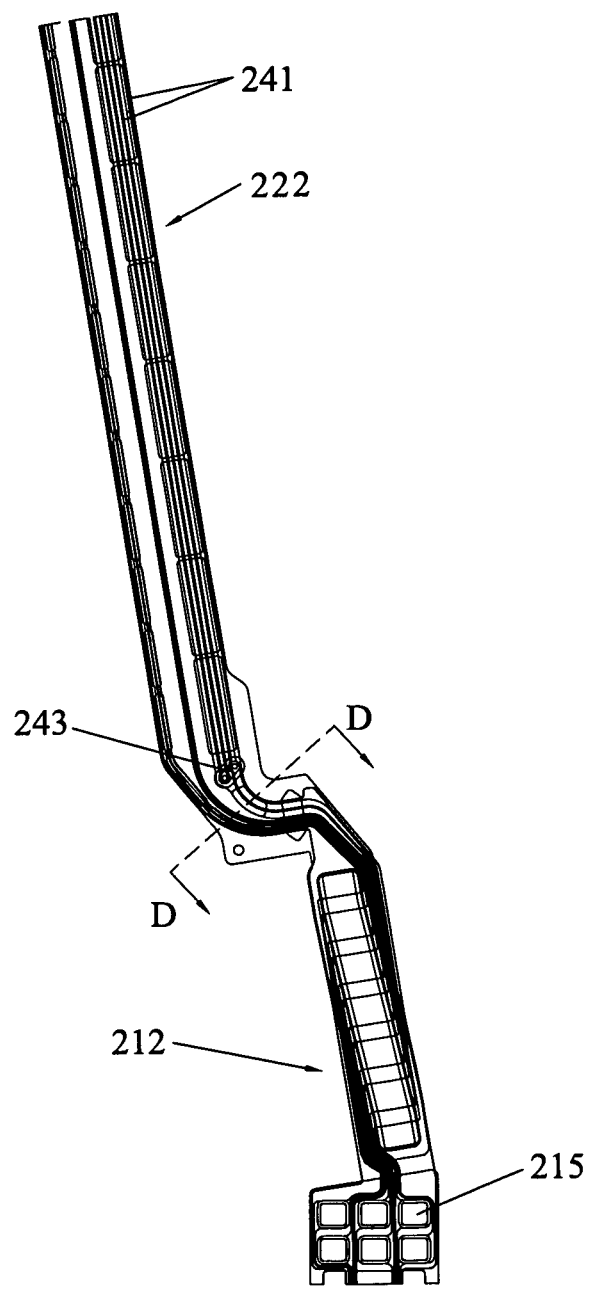
FIG. 5 is a partial structure view of the electrical traces of the flexure shown in FIG. 3.
Figure 6C:
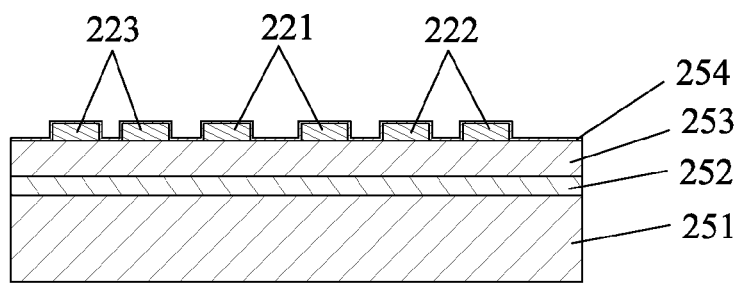
FIG. 6c is a cross-section view of the electrical traces taken along the line D-D of the FIG. 5.
Figure 6D:
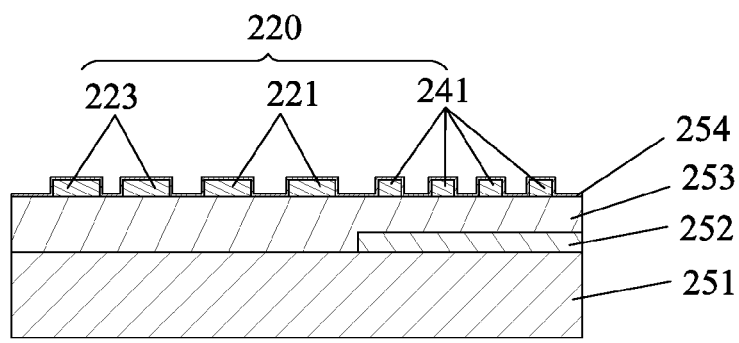
FIG. 6d is another cross-section view of the electrical traces according to another embodiment of the present invention.

FIG. 6b shows a cross-section view of the write trace 222 at the leading portion 211 taken along the line C-C of the FIG. 4; and FIG. 6c shows another cross-section view of the write trace 222 at the tailing portion 212 taken along the line D-D of the FIG. 5. It can be seen that, the laminate structure of the flexure 205 is similar to that of FIG. 6a. And the difference is merely that the electrical traces 220 includes a pair of read traces 221, a pair of write traces 222 and a pair of heat traces 223. That is, each of the write traces 222 are divided into two sub wires 241 at the forked portion 242, and then, the two sub wires 241 are joined together to become an integral write trace 222 at the confluent portion 243.

By such a design provided to write traces 222, during the writing operation, comparing with a single write trace, the impedance of the two sub wires 241 is decreased, to make the whole impedance of the write traces 222 to be decreased and, in turn, decrease the signal transmission loss. Thus, the performance of writing can be improved.

Preferably, the width of each sub wire 241 is in the range of 10 μm to 180 μm, and the spacing between the sub wires 241 is in the range of 10 μm to 20 μm, to maintain a good performance. The thickness of all the electrical traces 220 is about between 8 μm to 10 μm, and the thickness of the SST is in the range of 15 μm to 20 μm, the dielectric layer 253 has a thickness that is equal to or less than 10 μm. And the thickness of the grounding layer 252 is equal to 2 μm to achieve a wider frequency bandwidth.

In the present embodiment, 180 μm is applied to the width of the sub wires 241. As shown in 6a, the thickness of the sub wire 241 is 15 μm, and the spacing between two sub wires 241 is configured by 15 μm. The thickness of the substrate layer 251, the grounding layer 252, the dielectric layer 253 and the cover layer 254 is 20 μm, 10 μm and 5 μm respectively. By such a group data, a low impedance of about 10 Ohm is achieved, as shown in FIG. 7b.

As described above, compared with the prior art, since each of the write wire of the present invention is divided into two sub wires 241, thus the impedance is decreased and the signal transmission loss is decreased in turn, which is beneficial to the performance of writing operation. On the other hand, due to the suitable grounding layer 252 is configured, thus a sufficient wide frequency bandwidth can be obtained and maintained. Therefore, in the present invention, it can achieve not only a low impedance to decrease the signal transmission loss, but also a wide frequency bandwidth to improve the writing performance.

Figure 8:
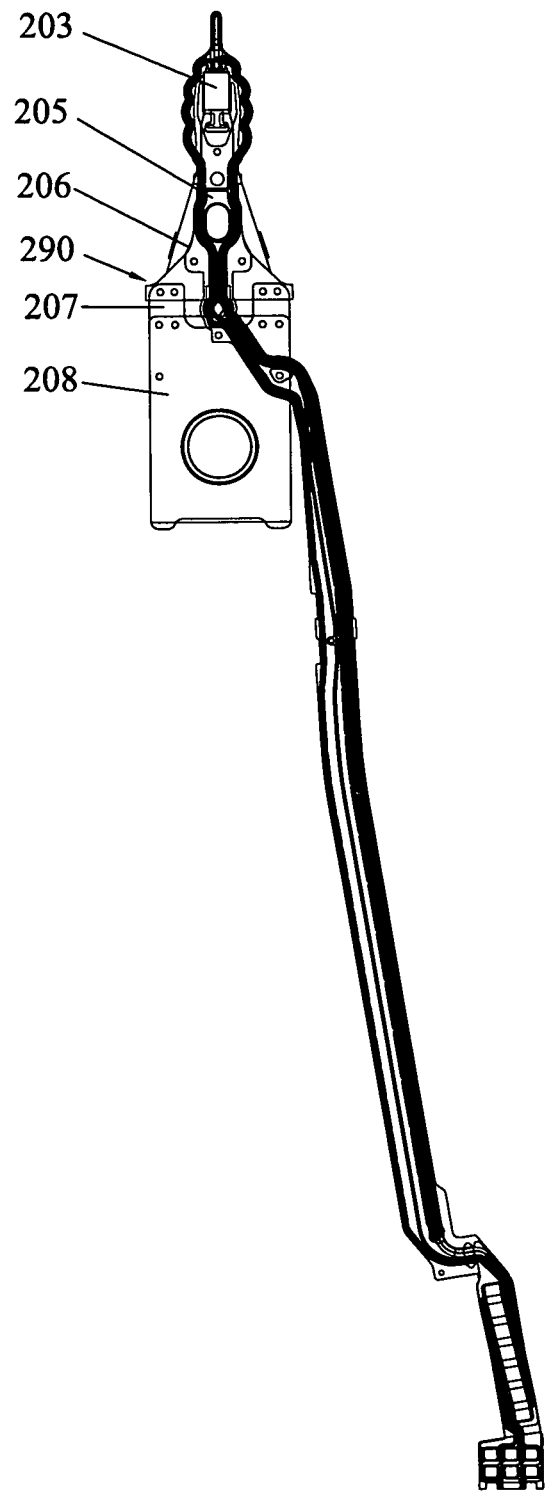
FIG. 8 is a perspective view of a HGA according to an embodiment of the present invention.

Now, referring to FIG. 8, a HGA 200 according to an embodiment of the invention comprises a suspension 290 and a slider 203 carried on the suspension 290. The suspension 290 comprises a load beam 206, a base plate 208, a hinge 207 and the flexure 205, all of which are assembled with each other. The hinge 207 has a mounting hole 210 formed thereon to assemble the hinge 207 to the base plate 208. And then the slider 203 is carried on the flexure 205. It's known that the slider 203 has terminals that are connected to a write element and a read element (sensor), which are connected to the write and read terminals. The write element is, for example, a standard induction type magnetic transducer. The read element is a MR element, a GMR element, or a TMR element having a high read sensitivity.

Figure 9:
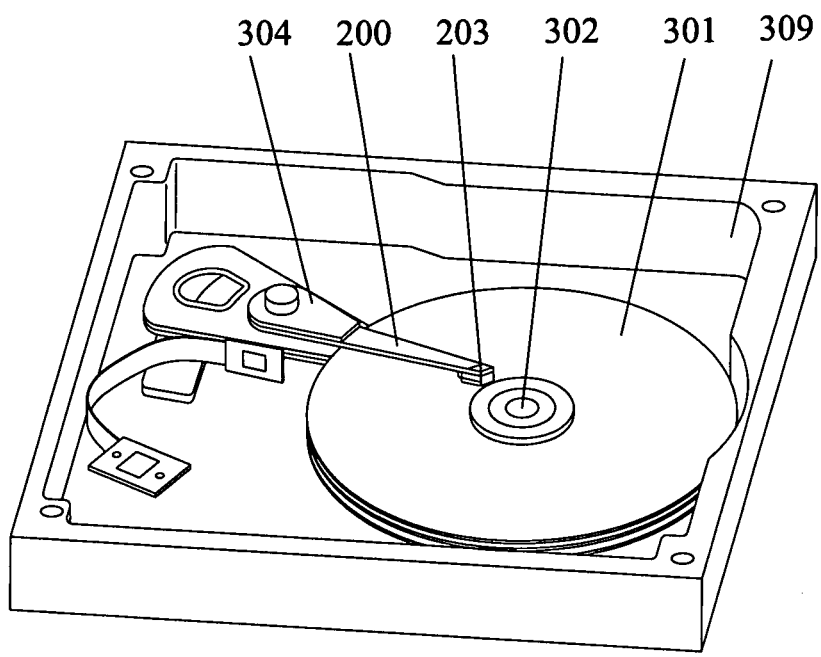
FIG. 9 is a perspective view of a disk drive unit according to an embodiment of the invention.

FIG. 9 is a disk drive unit according to an embodiment of the invention. The disk drive unit 300 comprises a HGA 200, a drive arm 304 connected to the HGA 200, a series of rotatable disks 301, and a spindle motor 302 to spin the disk 301, all of which are mounted in a housing 309. The HGA 200 includes a suspension 290 having a flexure 205 and a slider 203 as mentioned above. And the electrical traces 220 of the flexure 205 include write traces 222 each having two sub wires 241 as well, so as to obtain the same advantages mentioned-above. Because the structure and/or assembly process of disk drive unit of the present invention are well known to persons ordinarily skilled in the art, a detailed description of such structure and assembly is omitted herefrom.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A suspension for a head gimbal assembly, comprising:
a flexure having a leading portion and a tailing portion opposite to the leading portion; and the flexure has a laminated structure comprising a substrate layer, a dielectric layer, and a grounding layer sandwiched therebetween and arranged for improving frequency bandwidth; and
a plurality of electrical traces formed on the dielectric layer and extending from the leading portion to the tailing portion;
wherein the electrical traces comprise at least one pair of write traces, each write trace has a bonding pad positioned on the leading portion where a slider is connected, a terminal pad positioned on the tailing portion where a flexure printed cable is connected, and a write wire connecting the bonding pad and the terminal pad, wherein the write wire comprises a forked portion arranged between a free or unsupported longitudinal end of the leading portion and the bonding pad, and a confluent portion positioned on the tailing portion and adjacent to the terminal pad, the write wire has at least one portion being furcated into at least two sub wires via the forked portion, and the two sub wires are joined together via the confluent portion.

2. The suspension according to claim 1, wherein the width of each sub wire is in the range of 10 μm to 180 μm.

3. The suspension according to claim 1, wherein the spacing between the sub wires is in the range of 10 μm to 20 μm.

4. The suspension according to claim 1, wherein the grounding layer is made of high conductivity material.

5. The suspension according to claim 4, wherein the high conductivity material is copper.

6. The suspension according to claim 1, wherein the thickness of the grounding layer is in the range of 1 μm to 5 μm.

7. The suspension according to claim 1, wherein the substrate layer is made of stainless steel.

8. The suspension according to claim 1, further comprising a cover layer formed on the electrical traces.

9. A head gimbal assembly, comprising:
a slider;
a suspension for supporting the slider,
the suspension comprising:
a flexure having a leading portion and a tailing portion opposite to the leading portion;
and the flexure has a laminated structure comprising a substrate layer, a dielectric layer, and a grounding layer sandwiched therebetween and arranged for improving frequency bandwidth; and
a plurality of electrical traces formed on the dielectric layer and extending from the leading portion to the tailing portion;
wherein the electrical traces comprise at least one pair of write traces, each write trace has a bonding pad positioned on the leading portion where the slider is connected, a terminal pad positioned on the tailing portion where a flexure printed cable is connected, and a write wire connecting the bonding pad and the terminal pad, wherein the write wire comprises a forked portion arranged between a free or unsupported longitudinal end of the leading portion and the bonding pad, and a confluent portion positioned on the tailing portion and adjacent to the terminal pad, the write wire has at least one portion being furcated into at least two sub wires via the forked portion, and the two sub wires are joined together via the confluent portion.

10. The head gimbal assembly corresponding to claim 9, wherein the width of each sub wire is in the range of 10 μm to 180 μm.

11. The head gimbal assembly according to claim 9, wherein the spacing between the sub wires is in the range of 10 μm to 20 μm.

12. The head gimbal assembly according to claim 9, wherein the grounding layer is made of high conductivity material.

13. The head gimbal assembly according to claim 12, wherein the high conductivity material is copper.

14. The head gimbal assembly according to claim 9, wherein the thickness of the grounding layer is in the range of 1 μm to 5 μm.

15. The head gimbal assembly according to claim 9, wherein the substrate layer is made of stainless steel.

16. The head gimbal assembly according to claim 9, further comprising a cover layer formed on the electrical traces.

17. A disk drive unit, comprising:
a head gimbal assembly including a slider and a suspension that supports the slider;

a drive arm connected to the head gimbal assembly;
a series of disks; and
a spindle motor operable to spin the disks;
the suspension comprising:
a flexure having a leading portion and a tailing portion opposite to the leading portion;
and the flexure has a laminated structure comprising a substrate layer, a dielectric layer, and a grounding layer sandwiched therebetween and arranged for improving frequency bandwidth; and
a plurality of electrical traces formed on the dielectric layer and extending from the leading portion to the tailing portion;
wherein the electrical traces comprise at least one pair of write traces, each write trace has a bonding pad positioned on the leading portion where the slider is connected, a terminal pad positioned on the tailing portion where a flexure printed cable is connected, and a write wire connecting the bonding pad and the terminal pad, wherein the write wire comprises a forked portion arranged between a free or unsupported longitudinal end of the leading portion and the bonding pad, and a confluent portion positioned on the tailing portion and adjacent to the terminal pad, the write wire has at least one portion being furcated into at least two sub wires via the forked portion, and the two sub wires are joined together via the confluent portion.

* * * * *